United States Patent
Uesaka et al.

(10) Patent No.: US 7,912,380 B2
(45) Date of Patent: Mar. 22, 2011

(54) OPTICAL RECEIVER

(75) Inventors: Katsumi Uesaka, Yokohama (JP); Keiji Tanaka, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 1016 days.

(21) Appl. No.: 11/416,389

(22) Filed: May 3, 2006

(65) Prior Publication Data

US 2006/0263100 A1    Nov. 23, 2006

(30) Foreign Application Priority Data

May 10, 2005  (JP) ............................. P. 2005-137421
Jul. 28, 2005  (JP) ............................. P. 2005-219411

(51) Int. Cl.
*H04B 10/06*  (2006.01)

(52) U.S. Cl. .......... 398/202; 398/206; 398/209; 398/38; 398/25

(58) Field of Classification Search ................... 398/202, 398/140, 135, 206, 209, 33, 38, 25, 9; 250/214.1, 250/214 R
See application file for complete search history.

(56) References Cited

U.S. PATENT DOCUMENTS

| | | | | |
|---|---|---|---|---|
| 5,007,038 | A  * | 4/1991  | Nakane et al. | 369/44.11 |
| 6,333,804 | B1 * | 12/2001 | Nishiyama et al. | 398/202 |
| 6,476,954 | B1 * | 11/2002 | Nishizono | 398/202 |
| 6,539,036 | B2 * | 3/2003  | Lehr et al. | 372/29.016 |
| 6,731,881 | B2 * | 5/2004  | Nomura | 398/135 |
| 7,214,922 | B2 * | 5/2007  | Takiba et al. | 250/208.4 |
| 7,657,191 | B2 * | 2/2010  | Killmeyer et al. | 398/202 |
| 2001/0050333 | A1 * | 12/2001 | Feng et al. | 250/214 A |
| 2002/0153475 | A1 * | 10/2002 | Gurunathan et al. | 250/214 A |
| 2003/0002552 | A1 * | 1/2003  | Nagara | 372/38.02 |
| 2003/0164731 | A1 * | 9/2003  | Yoon | 330/9 |
| 2003/0210917 | A1 * | 11/2003 | Stewart et al. | 398/209 |
| 2004/0062557 | A1 * | 4/2004  | Takashima et al. | 398/209 |
| 2005/0175359 | A1 * | 8/2005  | Tsai | 398/202 |
| 2006/0027736 | A1 * | 2/2006  | Ichino et al. | 250/214 R |

FOREIGN PATENT DOCUMENTS

| | | |
|---|---|---|
| JP | 63-224522 | 9/1988 |
| JP | 5-7582 | 2/1993 |
| JP | 11-298259 | 10/1999 |
| JP | 2003-198279 | 7/2003 |

OTHER PUBLICATIONS

Notification of Reasons of Rejection issued on Sep. 26, 2008 with English translation.
Japanese Office Action issued Feb. 12, 2010 for priority Japanese Application No. 2006-137421 w/English language translation.

* cited by examiner

*Primary Examiner* — Ken N Vanderpuye
*Assistant Examiner* — Hibret A Woldekidan
(74) *Attorney, Agent, or Firm* — Smith, Gambrell & Russell, LLP

(57) ABSTRACT

The present invention provides an optical receiver able to monitor the level of the optical input signal in accurate even when the level is quite small. The optical receiver comprises a photodiode to generate a photocurrent Ipd, a current mirror circuit to reflect the photocurrent into a mirrored current Imon, a current-to-voltage converter to convert the mirrored current Imon to a voltage signal, switch to connect/cut the current mirror circuit with the current-to-voltage converter, and a correction unit for subtracting a signal when the switch is connected from a signal when the switch is cut.

5 Claims, 10 Drawing Sheets

OPTICAL RECEIVER

BACKGROUND OF THE INVENTION

1. Field of the Invention

The present invention relates to an optical receiver for receiving an optical signal in the optical communication system.

2. Related Art

Japanese Patent published as JP-2003-198279A has disclosed one type of optical receiver with a circuit for monitoring an optical input level, in which the output of the differential amplifier of the voltage follower is positively shifted to reduce an error due to the non-linearity of the output thereof by inserting a diode between the output of the differential amplifier of the voltage follower and the output of the feedback loop.

Conventional monitoring unit such as those disclosed in the Japanese Patent mentioned above includes a voltage follower configured by a differential amplifier whose non-inverting input is connected to a resister that converts a photocurrent generated by a photodiode by receiving the optical input signal into a voltage signal with a reference to the ground. When the optical input level is quite small for the photodiode to generate only a faint photocurrent, a voltage drop generated in the resistor by this photocurrent becomes quite small and the input level of the voltage follower is very close to the ground, to cause an output voltage error because of the nonlinear characteristic of the differential amplifier when its output is very small.

In the optical receiver disclosed in the Japanese Patent mentioned above, by inserting a diode in the output of the differential amplifier, the output thereof may be within a range securing the linearity even when the output of the feedback loop closes the ground level because the output of the differential amplifier is positively shifted by a forward voltage of the diode. However, the input of the differential amplifier is left in a very small voltage close to an input offset voltage of the differential amplifier when the optical input level is small. Thus, it is quite hard to monitor the optical input level in accurate when the level thereof is quite small.

Accordingly, the present invention, based on subjects mentioned above, is to provide an optical receiver with a function to accurately monitor the optical signal with a quite wide dynamic range.

SUMMARY OF THE INVENTION

First aspect of the present invention relates to an optical receiver, in particular, relates to a configuration of a circuit for monitoring an optical input level and for outputting a monitoring signal. First configuration of the optical receiver includes a photodiode, a current-to-voltage converter with a variable conversion gain, and a correction unit. The photodiode generates a current by receiving an optical input signal with a level. The current-to-voltage converter is configured to convert the current into first and second voltage signals with the first and second conversion gains, respectively. The correction unit subtracts the second voltage signal from the first voltage signal.

Second configuration of the optical receiver includes a photodiode, a current mirror circuit, a current-to-voltage converter, a switch, and a correction unit. The current mirror circuit, arranged between the photodiode and the switch, generates a current reflecting the photocurrent generated in the photodiode. The current-to-voltage converter of this configuration converts the output current of the current mirror circuit into a corresponding voltage signal. The switch, arranged between the current mirror circuit and the current-to-voltage converter, cuts or connects a current path between the current mirror circuit and the current-to-voltage converter. The correction unit subtracts a first signal, which is obtained by the current-to-voltage converter when the switch is cut, from a second signal obtained by the current-to-voltage converter when the switch is connected.

Third configuration of the optical receiver includes a photodiode, a trans-impedance amplifier including a differential amplifier with an inverting input terminal, a non-inverting input terminal and an output terminal, and a resistor connected between the inverting input and output terminals, and a correction unit. The trans-impedance amplifier converts the photocurrent generated in the photodiode into a voltage signal. The correction unit subtracts an input signal appeared in the inverting input terminal from the output voltage.

According to configurations of the optical receiver described above, an offset voltage inherently attributed to the current-to-voltage converter may be eliminated from the monitored output of the optical receiver. Therefore, even when the optical input level becomes quite small, a monitoring error caused by the offset voltage of the current-to-voltage converter can be maintained.

The second aspect of the present invention relates to a method for monitoring an optical input level of an optical input signal and for outputting a signal indicating the optical input level. The first method comprises steps of; (1) converting the optical input signal into a photocurrent by a photodiode, (2) converting the photocurrent into a first voltage signal with a first conversion gain, (3) converting the photocurrent into a second voltage signal with a second conversion gain, and (4) subtracting the second signal from the first signal.

The second method comprises steps of: (1) generating a mirrored current, which reflects a photocurrent, by a current mirror circuit that receives the photocurrent generated by a photodiode by receiving an optical input signal with a level, (2) generating a first signal by connecting the current path between the current mirror circuit and the current-to-voltage converter, (3) generating a second signal by cutting the current path between the current mirror circuit and the current-to-voltage converter, and (4) subtracting the second signal from the first signal.

The third method comprises steps of: (1) generating a photocurrent by a photodiode by receiving an optical input signal, (2) converting the photocurrent into a voltage signal by a current-to-voltage converter with a type of trans-impedance amplifier including a differential amplifier with output, inverting input, and non-inverting input terminals and a resistor connected between the inverting input and output terminals of the differential amplifier, and (3) subtracting a voltage signal induced in the inverting input terminal from the voltage signal appeared in the output terminal of the differential amplifier.

Since these methods may eliminate an effect of an offset inherently attributed to the current-to-voltage converter, or to the differential amplifier, a photocurrent generated in the photodiode of the receiver can be monitored in accurate even when the optical input level becomes small.

DETAILED DESCRIPTION OF THE PREFERRED EMBODIMENTS

Figure 1:
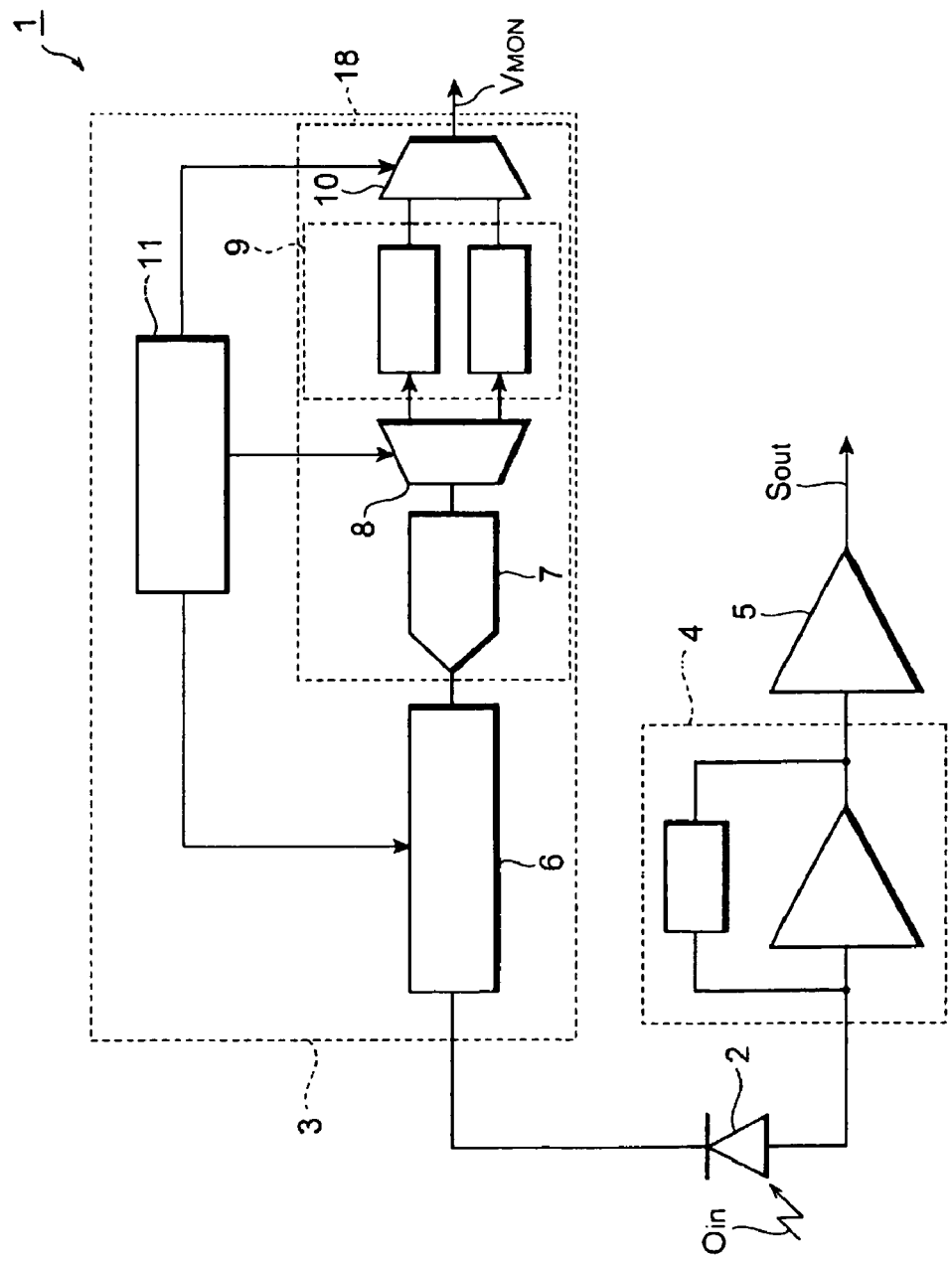
FIG. 1 is a block diagram of the optical receiver according to first embodiment of the present invention.

Next, preferred embodiments of the present invention will be described as referring to accompanying drawings. In the drawings and their explanations, the same numerals or symbols will refer to the same elements without overlapping explanations.

FIG. 1 is a block diagram of an optical receiver according to one embodiment of the present invention. The optical receiver 1, which is one of optical modules to output an electrical signal Sout corresponding to an input optical signal Oin to the outside, comprises a photodiode (hereinafter denoted as PD) 2, a monitoring unit 3, a pre-amplifier 4, and a main amplifier 5. The PD generates a photocurrent Ipd that reflects the input optical signal Oin. The monitoring unit 3, connected to a cathode of the PD 2, monitors the level of the input signal Oin. The pre-amplifier 4, connected to an anode of the PD 2, converts the photocurrent into a voltage signal. The main amplifier 5, connected to the pre-amplifier, amplifies the voltage signal and outputs thus amplified signal as an output signal Sout to the outside of the optical receiver 1.

The monitoring unit 3 includes a current-to-voltage converter (hereinafter denoted as I/V-C) 6, an analog-to-digital converter (hereinafter denoted as A/D-C) 7, a selector 8, a register 9, and an arithmetic logic unit (hereinafter denoted as ALU) 10. The I/V-C 6 is configured to have a variable conversion gain. The A/D-C 7 converts a voltage signal, which is output from the I/V-C 6, into a digital form. The selector 8 sends the digital signal converted by the A/D-C 7 into the register 9 that stores thus sent digital signal. The I/V-C 6, the selector 8 and the ALU 10 are controlled by a controller 11. These A/D-C 7, the selector 8, the register 9, and the ALU 10 constitute a correction unit 18 to generator a monitoring signal Vmon corresponding to the input signal Oin.

The I/V-C 6, connected to the cathode of the PD 2, converts the photocurrent Ipd into a voltage signal. The I/V-C 6 is configured to vary a conversion ratio from the current Ipd to the voltage signal based on a control signal supplied from the controller 11.

Figure 2:
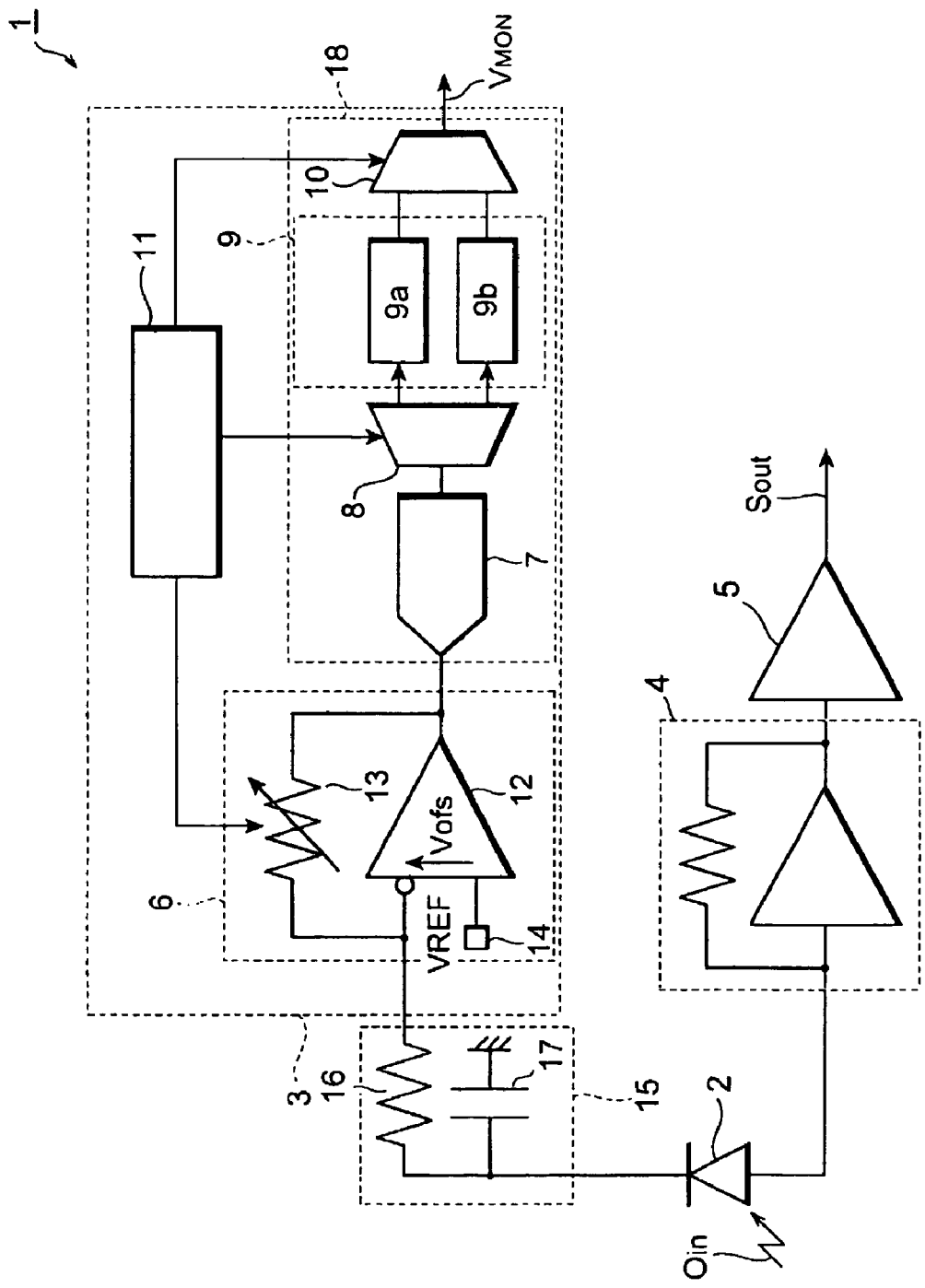
FIG. 2 schematically shows the current-to-voltage converter and a filter circuit each configured in the optical receiver shown in FIG. 1.

FIG. 2 shows the I/V-C 6 in detail. As shown in FIG. 2, the I/V-C 6 is one type of trans-impedance amplifier including a differential amplifier 12 with inverting input, non-inverting input and output terminals and a variable resistor 13 connecter between the inverting input and output terminals of the differential amplifier. The resistor 13 is configured as a variable trans-impedance. Based on the control signal supplied from the controller 11 to the variable resistor 13, the resistance of this variable resistor 13 may be changed, which varies the conversion gain.

The non-inverting input terminal of the differential amplifier 12 receives a reference voltage 14, which defines the output level of the differential amplifier 12. On the other hand, the inverting input terminal of the differential circuit 12 connects the cathode of the PD 2 via a filter circuit 15 to remove high frequency components contained in the photocurrent Ipd. Thus, an average of the photocurrent Ipd may be supplied to the inverting input terminal of the differential amplifier 12 and the variable resistor 13. Specifically, the filter circuit 15 includes a resistor 16 connected between the inverting input terminal of the differential amplifier 15 and the cathode of the PD 2, and a capacitor 17 connected between the cathode of the PD 2 and the ground. The output of the I/V-C 6 is led to the A/D-C 7 to convert the voltage signal into a digital form.

The output terminal of the A/D-C 7 connects the selector 8. This selector 8 is configured to receive the digital signal from the A/D-C 7 and to output this digital signal to one of registers, namely, the first register 9a or the second register 9b, commanded by the control signal supplied from the controller 11. Registers, 9a and 9b, store the digital signals sent from the selector 8.

The register unit 9 connects the ALU 10 configured to read the digital signal from one of the registers, 9a and 9b, commanded by the control signal supplied from the controller 11, to calculate the difference between two digital signals. The ALU 10 outputs this difference to the outside of the receiver 1 as a monitoring signal Vmon of the optical input signal Oin.

The controller 11 is configured to output a signal to the I/V-C 6 so as to vary the resistance of the variable resistor 13, and to output a signal to the selector 8 so as to store the first digital signal output from the A/D-C 7 into the first register 9a. The controller 11 is configured, subsequent to the outputting of the control signal to the selector 8 to store the digital signal into the first register 9a, to output a signal to the I/V-C 7 so as to vary the resistance of the variable resistor 13 to a value different from the current value, and to output a control signal to the selector 8 to store another digital signal currently output from the A/D-C 7 into the second register 9b. The controller 11 is further configured to output a control signal to the ALU 10 such that, after storing two digital signals into respective registers, 9a and 9b, the ALU 10 reads out these digital signals from the registers, 9a and 9b, and starts the subtraction of the second data from the first data to obtain the monitoring signal Vmon.

Figure 3:
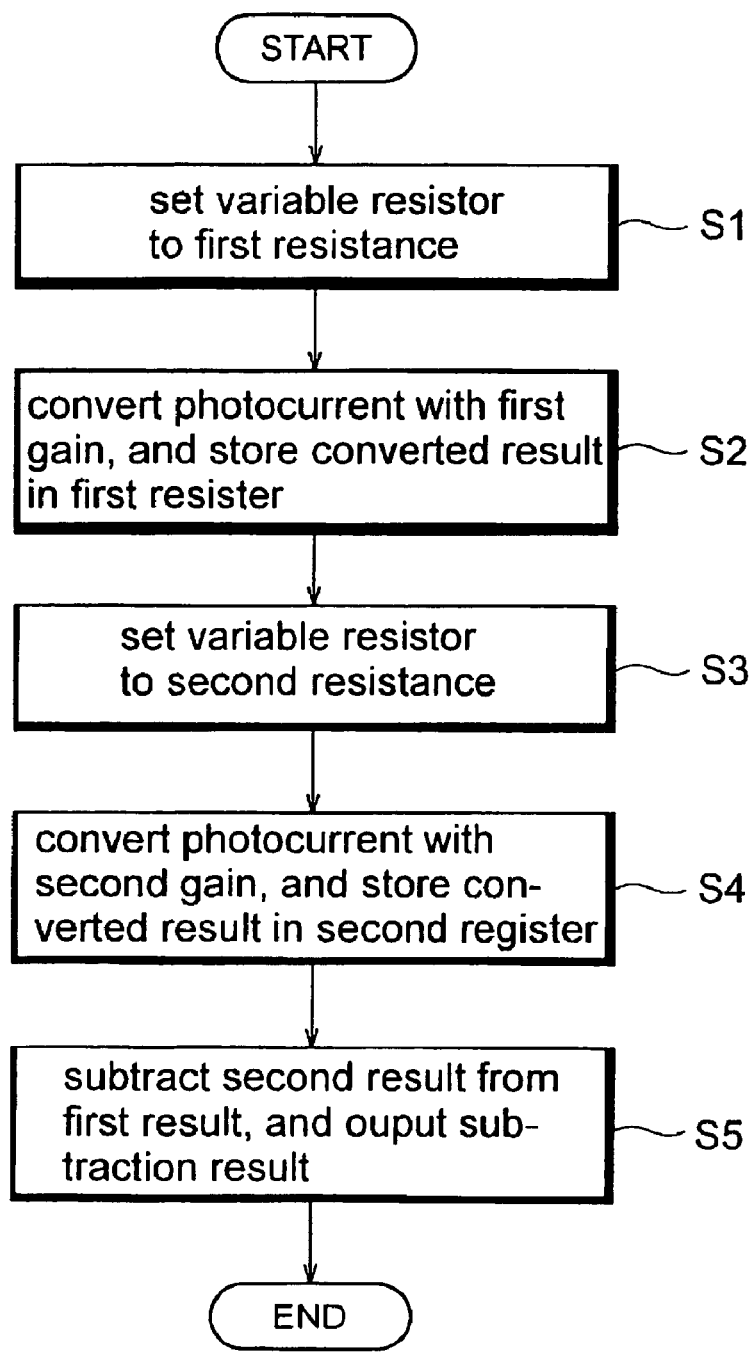
FIG. 3 is a flow chart for calculating the optical level by the power monitoring unit shown in FIG. 1.

Next, a process for calculating the monitoring signal Vmon will be described as referring to a flow chart shown in FIG. 3.

First, subsequent to the reception of the optical signal Oin by the PD 2 and receiving a command to start the monitoring of the optical input level from the outside of the receiver 1, the controller 11 sends the control signal to the I/V-C 6 to set the resistance of the variable resistor at step S1. In this step, assuming that the photocurrent Ipd from the PD 2, an input offset voltage of the differential amplifier are Ipd and Vofs, respectively, the output signal V1 output from the differential amplifier 12 becomes;

$$V1=VREF+Ipd \times R+Vofs, \quad (1)$$

where VREF is the input voltage to the non-inverting input terminal of the differential amplifier 12.

Next, after a processing period in the A/D-C 7, the controller 11 sends the command to the selector 8 to store the digital signal D1 output from the A/D-C 7 into the first register 9a at step S2. Here, assuming that bit width of the A/D-C 7 and the reference voltage operable within the A/D-C 7 are N and Vadc (>0), respectively, the digital signal D1 becomes;

$$D1=V1 \times (2^N-1)/Vadc=(VREF+Ipd \times R+Vofs) \times (2^N-1)/Vadc. \quad (2)$$

Subsequently, the controller 11 commands the I/V-C 6 to reduce the resistance of the variable resistor 13, for example, by half at step S3. In this step, the voltage signal V2 output from the I/V-C 6 becomes;

$$V2=VREF+Ipd \times R/2+Vofs. \quad (3)$$

Next, the controller 11 commands, after the processing period in the A/D-C 7, to the selector 8 to store the digital signal D2 output from the A/D-C 7 corresponding to the voltage signal V2 into the second register 9b at step S4. The digital signal D2 may be calculated in the A/D-C 7 as follows;

$$D2=V2 \times (2^N-1)/Vadc=(Ipd \times R/2+Vofs) \times (2^N-1)/Vadc. \quad (4)$$

Subsequently, the controller 11 sends the command to the ALU 10 to subtract the second signal D2 from the first signal D1 to get the monitoring signal Vmon at step S5. The ALU 10 outputs this monitoring signal Vmon to the outside of the receiver 1. The subtraction in the ALU 10 is carried out based on the following equation;

$$Vmon=2 \times (D1-D2). \quad (5)$$

When the ratio of the conversion gain of the I/V-C 6 at step S3 to the conversion gain at step S1 is m, Vmon becomes;

$$Vmon=(D1-D2)/(1-m). \quad (6)$$

Figure 4:
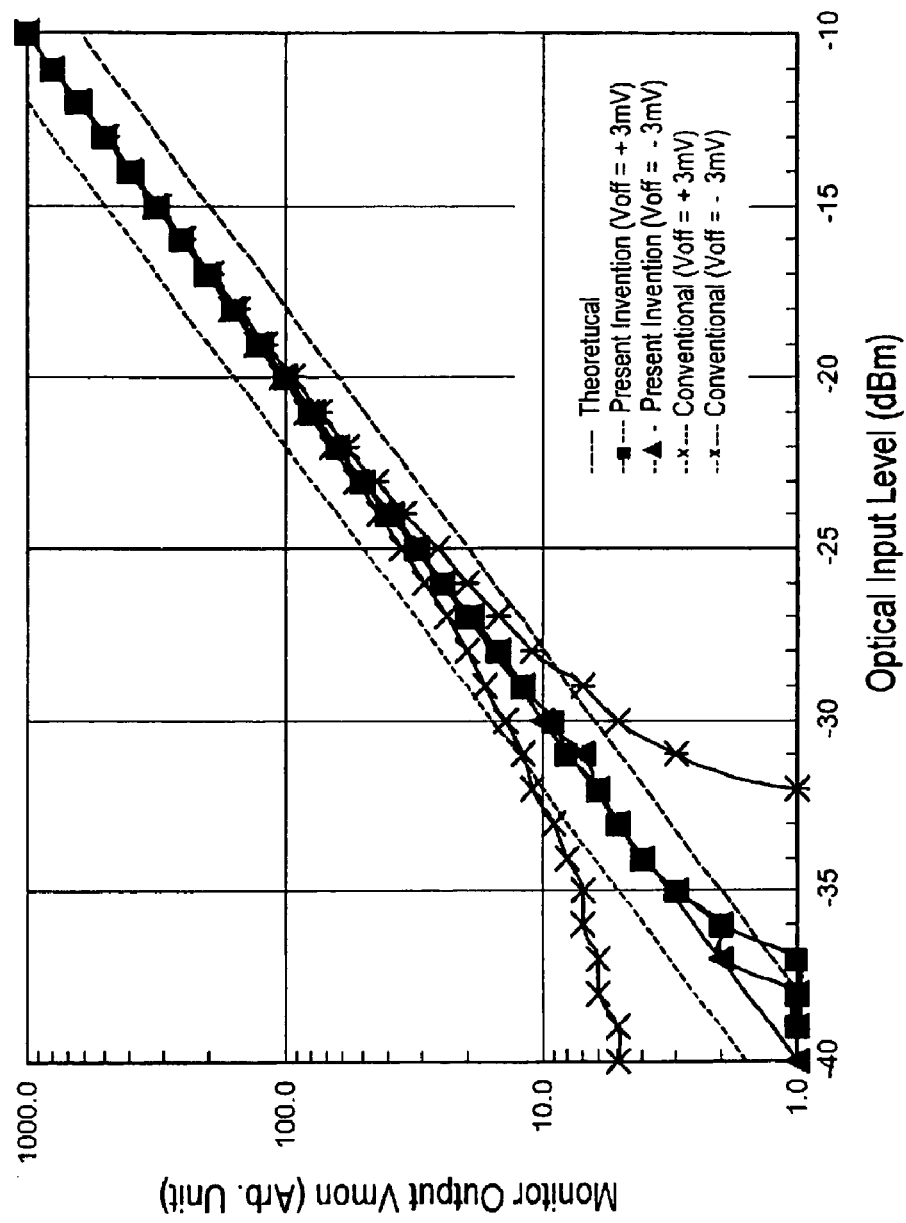
FIG. 4 shows simulation results of the monitored output from the correction unit against the optical input level for various optical receivers including that of the present invention.

FIG. 4 shows a simulation result under a condition that the variable resistor R, the bit width N of the A/D-C 7, the reference voltage Vadc, and the input offset voltage Vofs of the differential amplifier 12 are R=12.5 kΩ, N=15, VREF=2.5 V, and Vofs=±3 mV, respectively. In a conventional monitoring unit, the discrepancy from a theoretical lien becomes very large in a region where the optical input level is quite small. Assuming the offset voltage of the differential amplifier 12 is Vofs, the monitoring signal Vmon by the variable resistor R due to the photocurrent Ipd generated by the PD 2 becomes Vmon=Ipd*R+Vofs. Therefore, a quantizing error ERROR involved in the monitoring signal Vmon is denoted as:

$$ERROR=10 \times \log_{10}(1+Vofs/Ipd/R) \text{ [dB]}. \quad (7)$$

Thus, the input offset voltage Vofs influences on the quantizing error ERROR as the photocurrent Ipd becomes smaller. To obtain a precise result for monitoring the optical input level, it would be effective to make the resistance of the variable resistor 13 large. However, such large resistance would saturate the monitoring unit 3 at medium or large input levels. Therefore, to increase the resistance is a restricted means.

According to the optical receiver 1 described above, the photocurrent Ipd generated by the PD 2 based on the optical input signal Oin is converted into a voltage signal by the I/V-C 6. In this conversion process, at least two sets of the conversion gain may be set to generate a pair of voltage signals, V1 and V2. The monitoring signal Vmon is derived from the difference between these two voltage signals, V1 and V2. Accordingly, the offset voltage Vofs involved within both signals, V1 and V2, may be cancelled. Thus, even when the optical signal has a small level, the accuracy of the monitoring signal is maintained.

Second Embodiment

Figure 5:
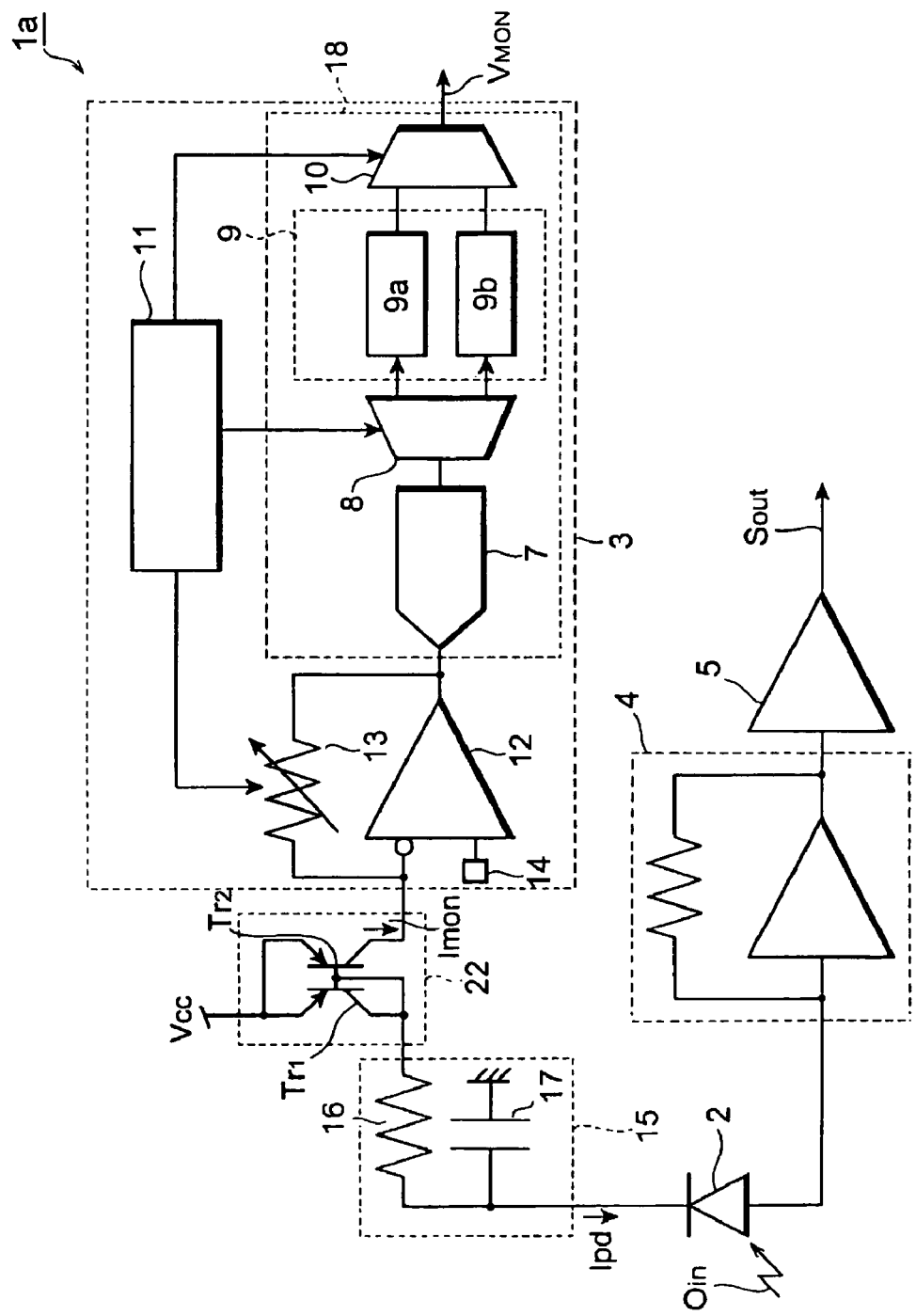
FIG. 5 is a block diagram of an optical receiver with a current mirror circuit according to second embodiment of the invention.

FIG. 5 is a block diagram showing an optical receiver 1b according to the second embodiment of the present invention. The optical receiver 1a provides, in addition to the embodiment shown in FIG. 2, a current mirror circuit 22 between the resistor 16 in the filter circuit 15 and the inverting input terminal of the differential amplifier 12. The current mirror circuit 22 has two current paths each including transistor, Tr1 or Tr2, whose bases and emitters are commonly connected. In the current mirror circuit 22, the photocurrent Ipd flowing out from the first transistor Tr1, namely, the first current path, shows a constant relation to the current Imon flowing out from the second transistor Tr2, namely, the second current path. The common emitters of transistors, Tr1 and Tr2, are connected to the power supply Vcc. The first current path is connected to the PD 2 via the filter circuit 15, while, the second current path is connected to the I/V-C 6. In the current mirror circuit 22, the current Imon flowing in the I/V-C 6 may be isolated from the photocurrent Ipd with the constant ratio. Accordingly, the former current Imon flowing in the I/V-C 6 may be independently adjusted and generally called as the mirrored current.

Third Embodiment

Figure 6:
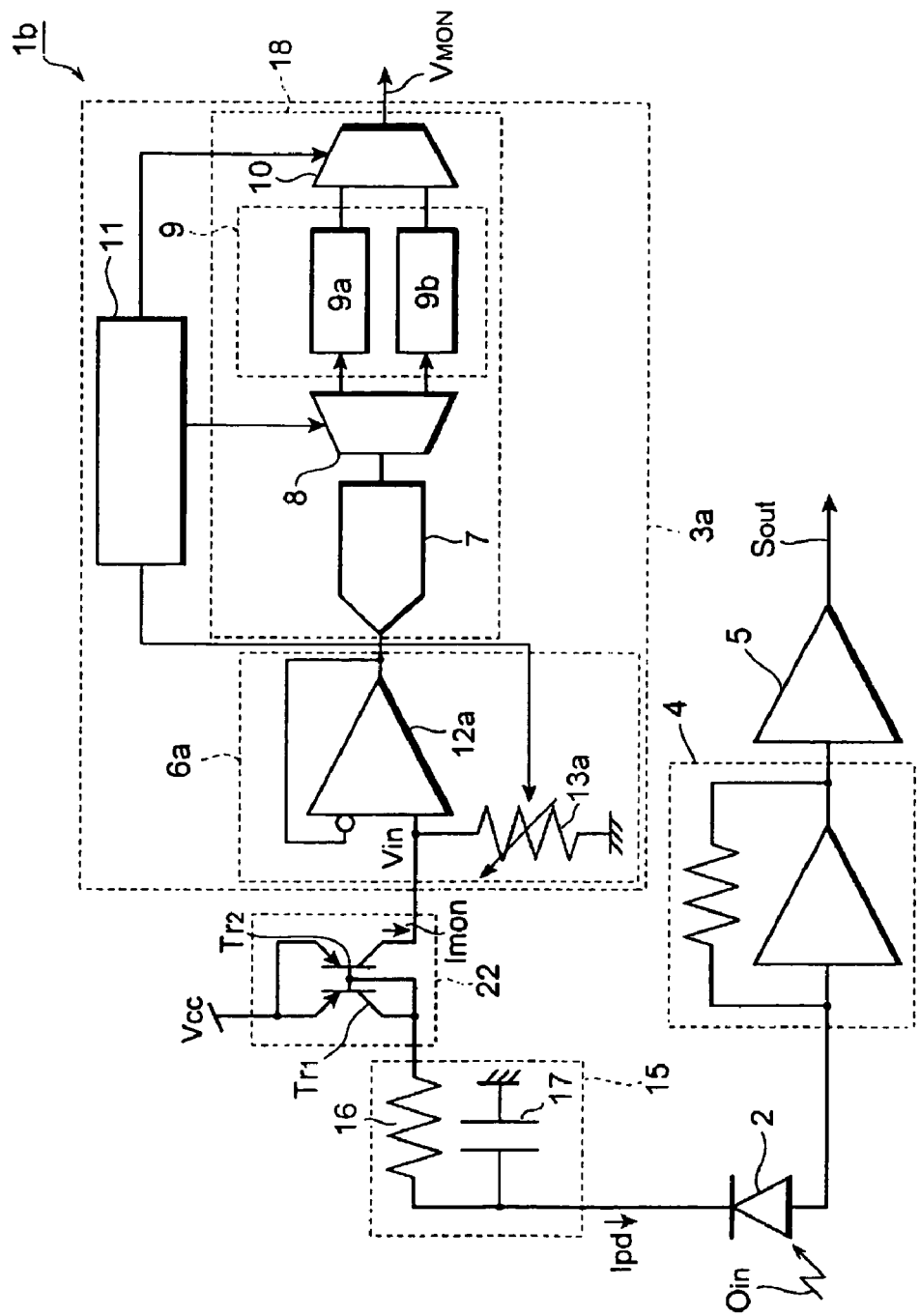
FIG. 6 is a block diagram of an optical receiver according to third embodiment of the present invention.

FIG. 6 shows another embodiment of the optical receiver that includes a modified current-to-voltage converter 6a. The optical receiver 1b includes a variable resistor 13a and a voltage follower 12a, where they constitute the I/V-C 6a. The variable resistor 13a is connected, in one terminal thereof, to the second current path of the current mirror circuit 22, while, the other terminal is grounded. Thus, the variable resistor 13a generates a voltage drop Vin depending on the mirrored current Imon flowing out from the current mirror circuit 22. The resistance of the variable resistor 13a may be controlled by the control signal supplied from the controller 11. The voltage drop Vin appeared in this variable resistor 13a is led to the A/D-C 7 via the voltage follower 12a.

Fourth Embodiment

Figure 7:
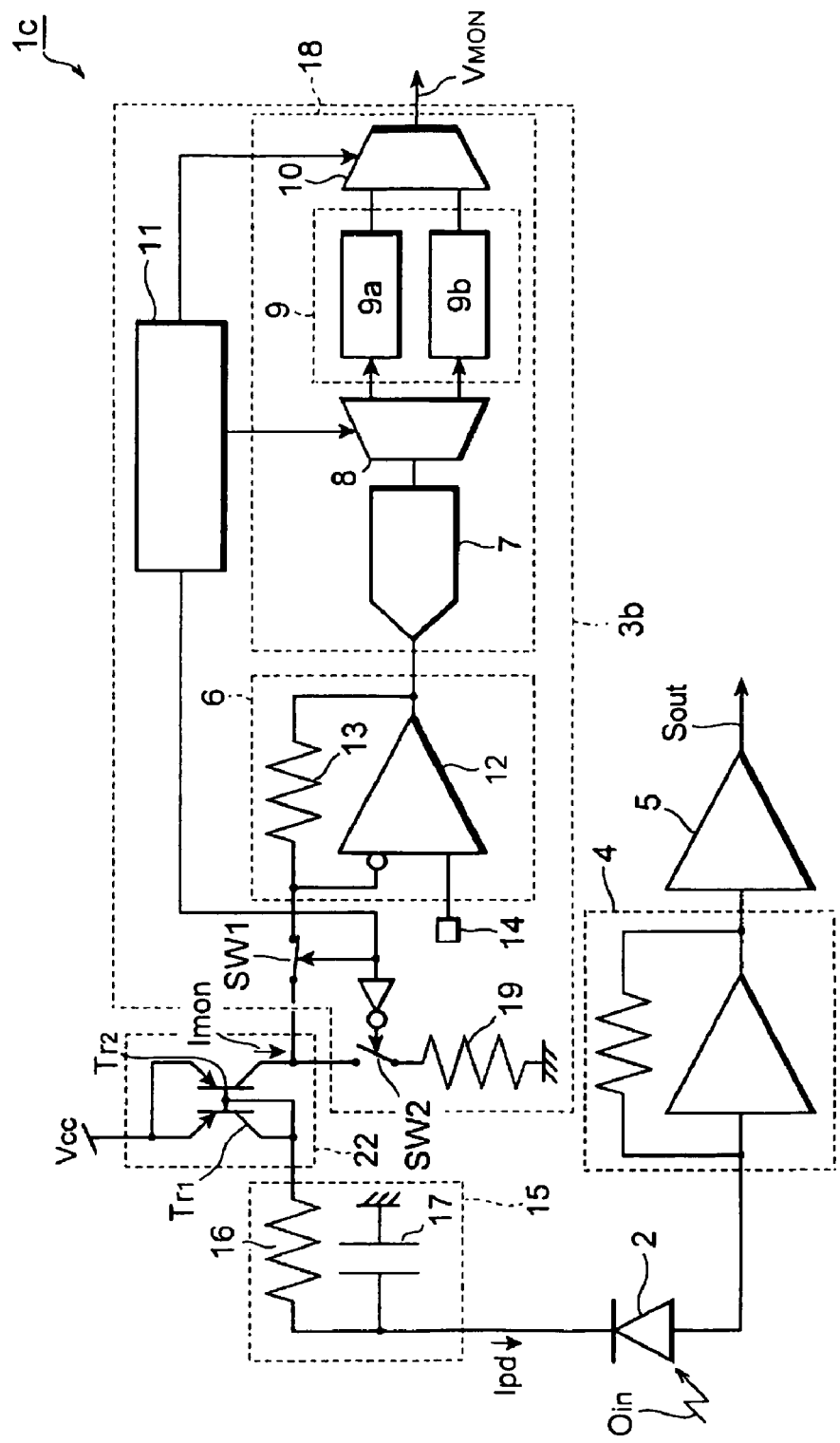
FIG. 7 is a block diagram of an optical receiver according to fourth embodiment of the present invention, which provides a switch between the current mirror circuit and the current-to-voltage converter.

FIG. 7 is a block diagram showing still another embodiment of optical receiver according to the present invention. The optical receiver 1c shown in FIG. 7 provides a current mirror circuit 22 and a modified monitoring unit 3b. The optical receiver 1c generates two signals each based on the photocurrent Ipd. The first transistor Tr1 provides the current path for the photocurrent Ipd. The second transistor Tr2 connected to the resistor 19 via the switch SW2 and to the inverting input terminal of the differential amplifier 12 via the switch SW1. These switches, SW1 and SW2, are complementarily operated to distribute the mirrored current Imon from the current mirror circuit 22 to one of the resistor 19 or the differential amplifier 12. The sequence of these switches, SW1 and SW2, are controlled by the signal sent from the controller 11.

When the first switch SW1 is put off, while, the second switch SW2 is put on by the controller 11, which connects the resistor 19 with the current mirror circuit 22, no current from the second transistor Tr2 of the current mirror circuit 22 flows into the I/V-C 6. Thus, the output of the I/V-C 6 reflects only the input offset of the differential amplifier 12.

Subsequent to the process above, the first switch SW1 is put on and the second switch SW2 is put off by the controller 11. Then, the current Imon output from the second transistor Tr2 flows into the I/V-C 6, and the I/V-C 6 converts this current into a voltage signal. In this step, the output of the I/V-C 6 includes both the voltage signal derived from the current Imon and the input offset of the differential amplifier 12. The correction unit processes this output voltage by the same procedure already mentioned. By subtracting the output voltage obtained in the former process from the output voltage by the present process, only voltage signal generated by the mirrored current Imon flowing in the second transistor TR2 that reflects the photocurrent Ipd can be extracted. Thus, the influence from the offset voltage of the differential amplifier 12 in the I/V-C 6 may be compensated.

Fifth Embodiment

Figure 8:
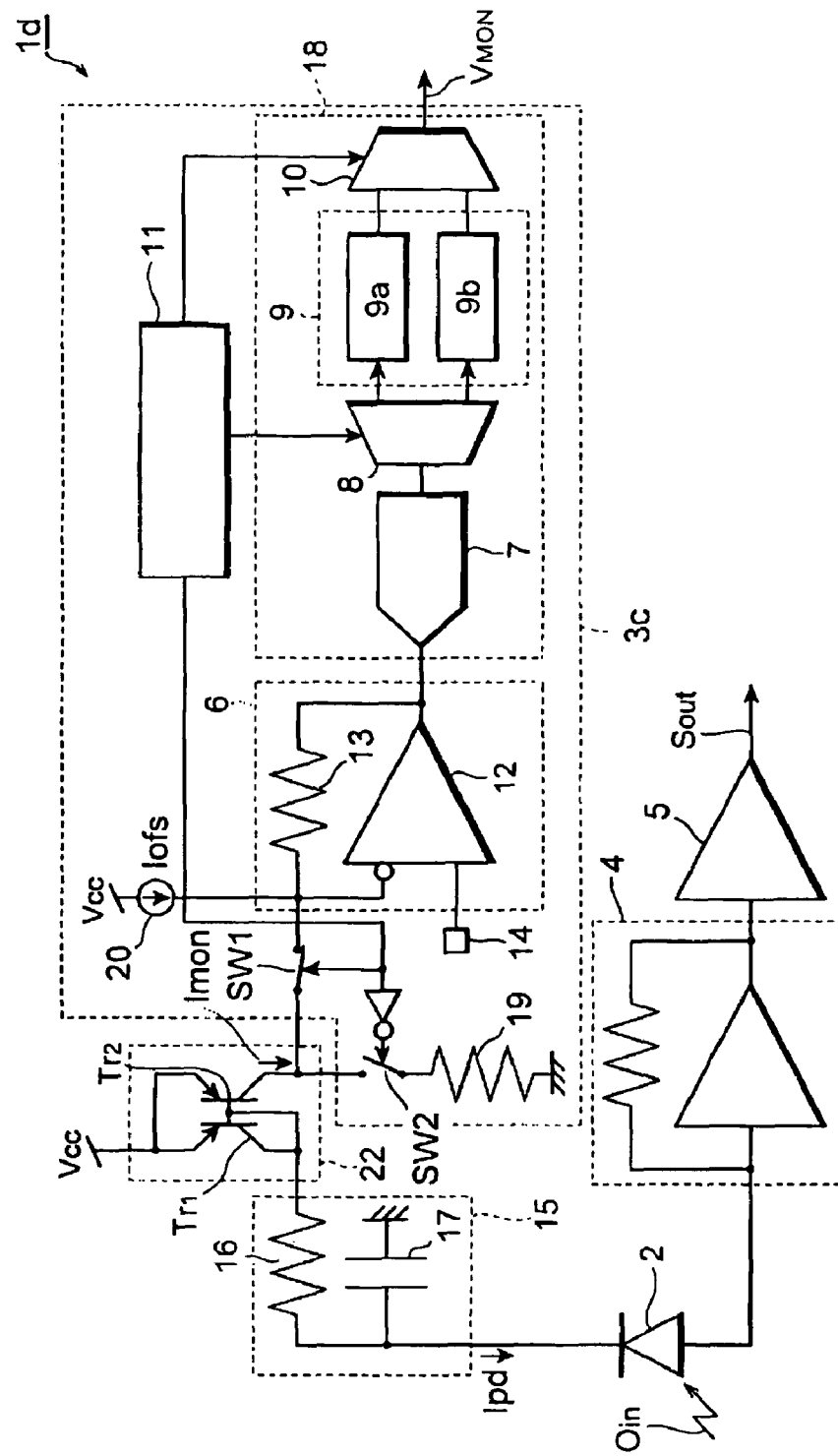
FIG. 8 is a block diagram of an optical receiver according to fifth embodiment of the invention, which provides an offset current source to the current-to-voltage converter.

When a negative offset appears in the output of the differential amplifier 12, which the A/D-C 7 cannot convert into a digital value, a positive offset is intentionally added by adding an offset current Iofs to the inverting input terminal of the differential amplifier 12 as shown in FIG. 8 such that the offset appears in the output of the differential amplifier 12 always becomes positive.

The magnitude of the currents flowing in respective paths of the current mirror circuit 22 may be adjusted by varying the collector size of each transistor, Tr1 or Tr2. Further, even when the collector size of transistors is substantially equal to each other, to insert a resistor between each emitter and the power supply Vcc, which is not shown in FIG. 7, and to adjust the resistance thereof determines the ratio $\alpha$ of the currents flowing in respective paths.

According to the optical receiver 1d of the present embodiment, the I/V-C 6 sequentially and alternately generates two voltage signals, one of which corresponds to the mirrored current Imon added by the input offset voltage Vofs of the differential amplifier 12, and the other of which corresponds only to the input offset voltage Vofs. The corrected monitoring signal Vmon may be derived from the subtraction of these two signals. Accordingly, the offset voltage inherently attributed to the differential amplifier 12 may be eliminated, the output Vmon of the receiver Id as the monitored optical level may be corrected even when the input optical level is quite small. Moreover, the offset voltage Vofs is affected by the operating temperature. Therefore, to eliminate the influence of the offset voltage may enhance the stability and the accuracy of the monitoring of the optical input level against the temperature.

Sixth Embodiment

Figure 9:
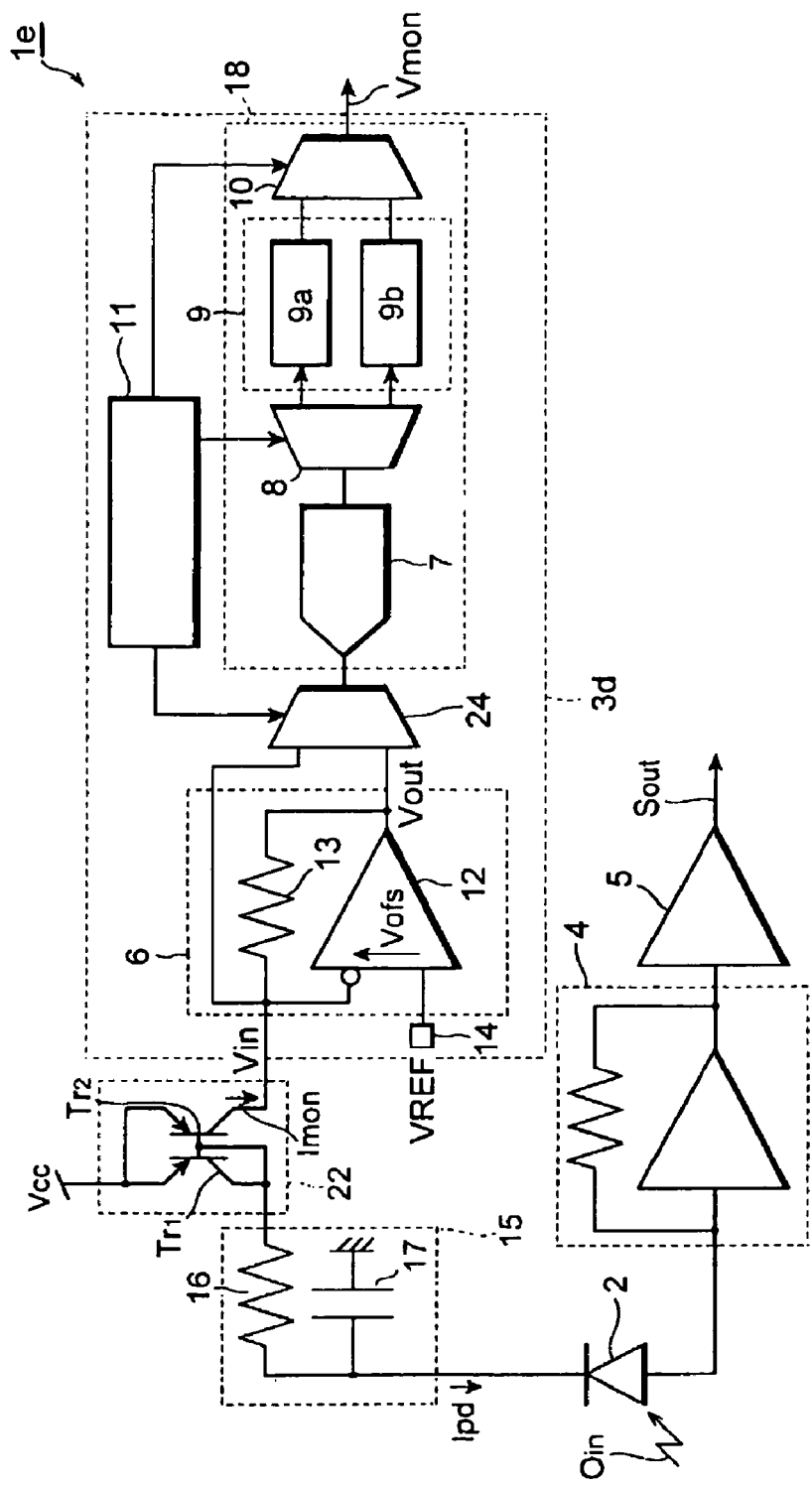
FIG. 9 is a block diagram of an optical receiver according to sixth embodiment of the present invention, which compare the input voltage with the output voltage of the current-to-voltage converter.

FIG. 9 shows an optical receiver 1e according to sixth embodiment of the invention, which provides a modified monitoring unit 3d. This monitoring unit 3d includes a selector 24 arranged between the I/V-C 6 and the A/D-C 7.

The selector 24 selects one of the inverting input and the output of the differential amplifier 12 and provides the selected signal to the A/D-C 7. The controller sends a control signal to the selectors, 24 and 8, to choose the output of the differential amplifier 12.

Next will describe an algorithm to evaluate the monitoring output Vmon according to the present embodiment.

When the input voltage of the inverting input terminal of the differential amplifier 12 is set to be VREF, the voltage appears in the inverting input of the differential amplifier 12 becomes;

$$Vin = VREF \pm Vofs, \quad (8)$$

where Vofs is an input offset of the differential amplifier 12. Assuminig the mirrored current flows into the I/V-C 6 is Imon, the output of the differential amplifier 12 is given by;

$$Vout = VREF \pm Vofs - Imon \times R, \quad (9)$$

By using the current ratio $\alpha$ of Imon to Ipd, the equation (9) can be rewritten as:

$$Vout = VREF + Vofs - Ipd/\alpha \times R. \quad (10)$$

Therefore, by subtracting Vin from Vout, the input offset voltage Vofs of the differential amplifier can be cancelled.

In the present embodiment, even when the selector 24 selects the input Vin of the differential amplifier 12, the resistor 13 is not cut off and has a substantial resistance, which maintains the closed loop for the differential amplifier 12. The A/D-C 7 sequentially converts above signals into corresponding digital forms. The output of the A/D-C 7 is led to the selector 8 in the correction unit 18 and the same procedures with those already mentioned are carried out to generate the corrected monitoring signal Vmon.

Thus, even in the monitoring unit 3d, the input offset voltage of the differential amplifier 12 may be corrected to enhance the accuracy of the monitoring signal Vmon even when the input optical level is quite small.

Seventh Embodiment

Figure 10:
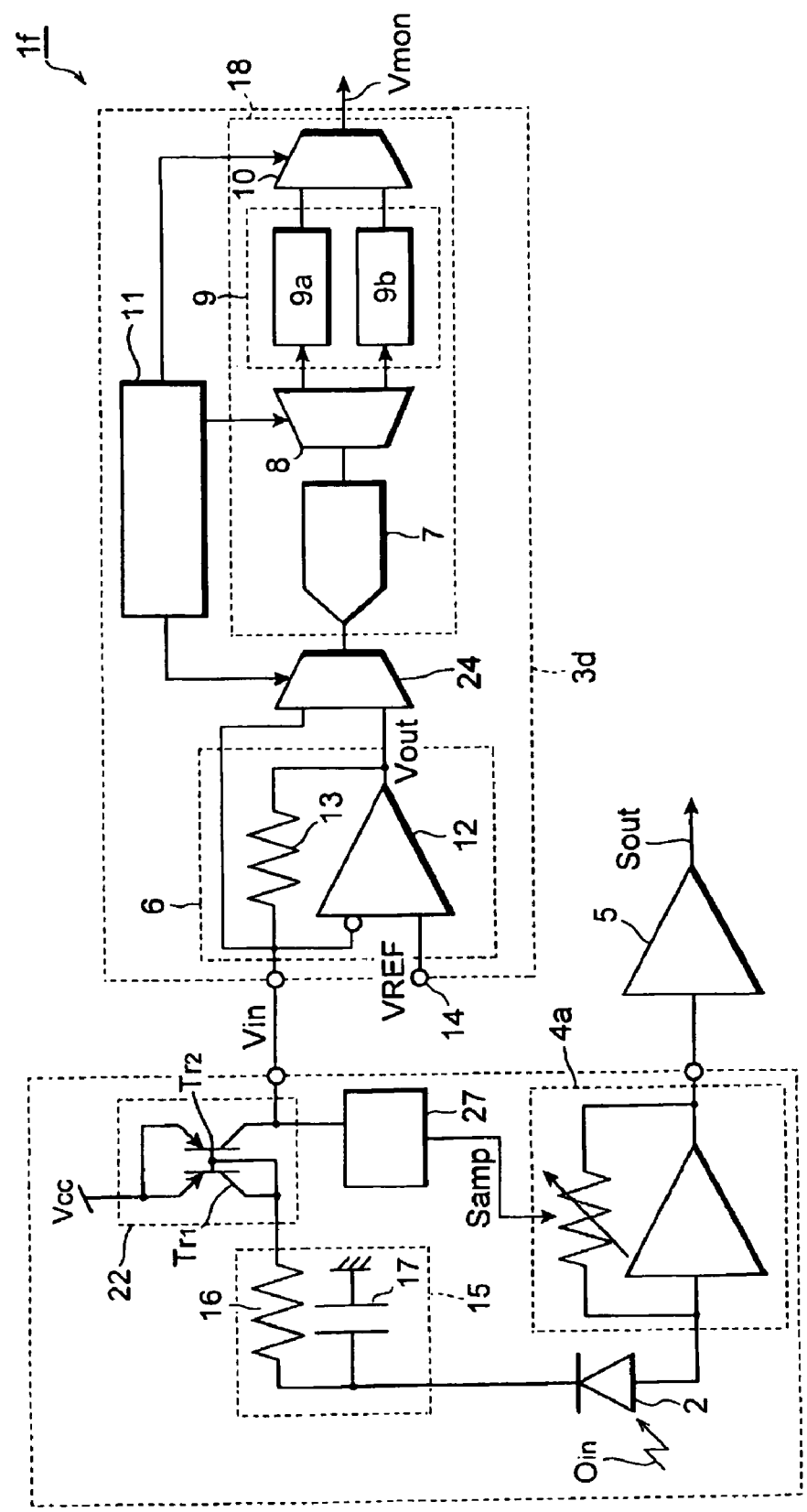
FIG. 10 is a block diagram of an optical receiver according to seventh embodiment of the present invention, which provides a package for enclosing the current mirror circuit, the filter circuit, the photodiode, the trans-impedance amplifier and the gain controller.

FIG. 10 is a block diagram of the optical receiver according to sixth embodiment of the present invention. The optical receiver 1f shown in FIG. 10, in addition to the monitoring unit 3d, provides a package 30 that installs the PD 2, the filter circuit 15, the current mirror circuit 22, the trans-impedance-amplifier 4a, and the second controller 27. The package 30 may be a CAN type package with a co-axial form. The trans-impedance amplifier 4a has a configuration of a variable performance in the current-to-voltage conversion gain against the frequency bandwidth. The second controller 27 generates a control signal Samp to adjust the performance of the trans-impedance amplifier 4a.

Features of this optical receiver if are, (1) the current mirror circuit 22 is installed within the package 30 with the PD 2, and (2) the conversion gain of the trans-impedance amplifier 4a is variable and the second controller 27 may adjust this conversion gain. Moreover, in addition to above two features, (3) the reference level VREF supplied to the differential amplifier 12 may be adjusted outside of the monitoring unit 3d.

Specifically, one output terminal of the current mirror circuit 22 is connected to the inverting input terminal of the differential amplifier 12 via one lead terminal of the package 30. Moreover, this lead terminal is also connected to the second controller 27. Here, the input impedance of the second controller 27 is set quite high so as to ignore the inflow of the mirrored current Imon thereinto.

The non-inverting input terminal of the differential amplifier 12 is exposed to the outside of the monitoring unit 3d to receive the reference level VREF. The input voltage Vin of the inverting input terminal may be determined based on this reference level VREF. Accordingly, by varying this reference level VREF, the input voltage Vin of the inverting input terminal may be varied.

On the other hand, the input voltage Vin is also brought to the second controller 27 within the package 30. The second controller 27 may generate the control signal Samp based on this input voltage Vin. That is, in the optical receiver if, the performance of the conversion gain against the frequency bandwidth of the trans-impedance amplifier 4a can be varied by adjusting the reference level VREF input to the terminal 14. The trans-impedance amplifier 4a may provide the same configuration with those of the differential amplifier 12, namely, an inverting amplifier with a feedback resistor connected between the input and output terminals thereof. In such configuration, when the feedback resistor may be variable in the resistance thereof by the control signal Samp, a trans-impedance amplifier with a variable performance of the conversion gain against the frequency bandwidth may be simply realized. Thus, the lead terminal of the package 30 for outputting the mirrored current Imon and another lead terminal to supply the control signal to the second controller 27 may be common to reduce a count of lead terminals of the package 30.

In the present embodiment, the reference level VREF3 varies its level to adjust the performance of the trans-impedance amplifier 4a. Two inputs of the selector 24, which is the input voltage Vin and the output Vout of the differential amplifier, are determined based on this external reference VREF. Accordingly, the input and output voltages, Vin and Vout, may not be always in a convertible range for the A/D-C 7. In this case, a level shifter may be added between selector 24 and the A/D-C 7 to bring the level of two signals, Vin and Vout, within an appropriate range for the A/D-C 7.

The optical receiver 1e of the present embodiment provides the trans-impedance amplifier 4a with the variable performance in the conversion gain against the frequency bandwidth. When the frequency, namely, the transmission speed of the optical input signal has relatively high, the conversion gain of the trans-impedance amplifier 4a may be reduced to widen the frequency bandwidth thereof. On the other hand, when the signal frequency is relatively low, the bandwidth of the trans-impedance amplifier 4a may be narrowed to enhance the conversion gain thereof.

The present invention is not restricted to those embodiments described in the specification and accompanying drawings. For example, the selector 8, the registers, 9a and 9b, and the ALU 10 may be configured independently, or, may be realized by the software on single digital processor. Moreover, the photodiode 2 for a light-receiving device may be replaced by an avalanche photodiode (APD). Thus, it will be apparent to those skilled in the art that numerous modifications and variations can be made without departing from the scope of the invention as defined in the appended claims.

What is claimed is:

1. An optical receiver comprising:
a photodiode for generating a photocurrent by receiving an optical input signal with a level corresponding to the photocurrent;
a current mirror circuit for generating a mirrored current by receiving the photocurrent;
a current-to-voltage converter to convert the mirrored current into a voltage signal;
a first switch arranged between the current mirror circuit and the current-to-voltage converter;
a resistor;
a second switch inserted between the resistor and an output terminal of the current mirror circuit for outputting the mirrored current;
a current source for generating an offset current for the current-to-voltage converter, the offset current being converted by the current-to-voltage converter independent of a state of the first switch; and
a correction unit for subtracting a first voltage signal from a second voltage signal, wherein the first voltage signal is generated by the current-to-voltage converter when the first switch cuts the current-to-voltage converter from the current mirror circuit, and the second voltage signal is generated by the current-to-voltage converter when the first switch connects the current-to-voltage converter with the current-mirror circuit,
wherein the first switch and the second switch complementary operate with each other.

2. An optical receiver including a power monitoring circuit for outputting a monitoring signal corresponding to a photocurrent generated by a photodiode by receiving an optical signal with an optical level, the optical receiver comprising:
a current mirror circuit for generating a mirrored current by receiving the photocurrent;
at least one current-to-voltage converter with a variable conversion gain for converting mirrored current into a first voltage signal when the variable conversion gain of the at least one current-to-voltage converter is set to a first gain, and for converting the mirrored current into a second voltage signal when the variable conversion gain of the at least one current-to-voltage converter is set to a second gain different from the first gain; and
a correction unit for subtracting the first voltage signal from the second voltage signal to generate the monitoring signal, wherein
the at least one current-to-voltage converter includes a resistor and a voltage follower,
the mirrored current flowing in the resistor and the voltage follower detects a voltage drop induced in the resistor due to the following of the mirrored current, and
the conversion gain of the current-to-voltage converter is set by changing the resistance of the resistor.

3. The optical receiver according to claim 2, wherein
the at least one current-to-voltage converter is a trans-impedance amplifier including an inverting amplifier and a resistor connected between input and output terminals of the inverting amplifier, and
the first gain of the at least one current-to-voltage converter is obtained by setting the resistor to a first resistance and the second gain of the at least one current-to-voltage convertor converter is obtained by setting the resistor to a second resistance.

4. An optical receiver, comprising:
a photodiode for generating a photocurrent by receiving an optical input signal with a level;
a current mirror circuit outputting a mirrored current from a terminal by receiving the photocurrent;
a first trans-impedance amplifier including a differential amplifier and a resistor, wherein the differential amplifier has an inverting input terminal, a non-inverting input terminal, and an output terminal, the resistor being connected between the output terminal and the inverting input terminal of the differential amplifier, the trans-impedance amplifier converting the mirrored current into an output voltage signal corresponding to an average of the photocurrent;
a second trans-impedance amplifier with an inverting amplifier and a variable resistor connected between the input terminal and the output terminal of the inverting amplifier of the second trans-impedance amplifier, the second trans-impedance amplifier converting the photocurrent into a signal voltage;

a controller for adjusting resistance of the variable resistor in the second trans-impedance amplifier;

a correction unit for subtracting an input voltage appearing at the inverting input terminal of the differential amplifier from the output voltage signal appearing in the output terminal of the differential amplifier; and a package for installing the photodiode, the controller, and the current mirror circuit therein, wherein the current mirror circuit is arranged between the photodiode and the first trans- impedance amplifier, and the first trans-impedance amplifier and the controller are connected to the terminal of the current mirror circuit.

5. The optical receiver according to claim 4, wherein the non-inverting input terminal of the differential amplifier receives a reference voltage to vary the input voltage induced in the inverting input terminal of the differential amplifier.

* * * * *